(12) United States Patent
Buska et al.

(10) Patent No.: US 8,545,965 B2
(45) Date of Patent: Oct. 1, 2013

(54) METHOD OF MANUFACTURING OF LIGHTWEIGHT STRUCTURAL TRIM PART AND LIGHTWEIGHT STRUCTURAL TRIM PART PRODUCED

(75) Inventors: Bertrand Buska, Bezu Saint Eloi (FR); David Simon, Guyancourt (FR); Virginie Auger, Treillieres (FR)

(73) Assignee: Rieter Technologies AG, Winterthur (CH)

( * ) Notice: Subject to any disclaimer, the term of this patent is extended or adjusted under 35 U.S.C. 154(b) by 988 days.

(21) Appl. No.: 11/917,385

(22) PCT Filed: Jun. 19, 2006

(86) PCT No.: PCT/EP2006/005861
§ 371 (c)(1),
(2), (4) Date: Dec. 7, 2009

(87) PCT Pub. No.: WO2006/133969
PCT Pub. Date: Dec. 21, 2006

(65) Prior Publication Data
US 2012/0328847 A1      Dec. 27, 2012

(30) Foreign Application Priority Data

Jun. 17, 2005   (EP) .................................... 05013120

(51) Int. Cl.
*B32B 3/26*      (2006.01)
*B32B 37/10*     (2006.01)
*B29C 51/10*     (2006.01)
*B29D 24/00*     (2006.01)

(52) U.S. Cl.
USPC ........ 428/166; 428/178; 296/146.7; 264/258; 264/268; 264/545; 156/245; 156/286; 156/290; 156/292

(58) Field of Classification Search
USPC ................... 428/166, 178; 156/87, 242, 245, 156/285, 286, 290, 292; 264/101, 258, 319, 264/553, 571, 268, 545; 296/146.7
See application file for complete search history.

(56) References Cited

U.S. PATENT DOCUMENTS 3,008,214 A * 11/1961 Foster et al. .................... 428/12
4,435,015 A *  3/1984 Trotman et al. .......... 297/452.45
6,183,838 B1 * 2/2001 Kannankeril ................. 428/119

FOREIGN PATENT DOCUMENTS

DE     1949209       4/1971
DE     9404621       7/1994

(Continued)

OTHER PUBLICATIONS

PCT Search Report, Nov. 14, 2006.

(Continued)

*Primary Examiner* — Donald J Loney
(74) *Attorney, Agent, or Firm* — Finnegan, Henderson, Farabow, Garrett & Dunner, LLP

(57) ABSTRACT

A method for manufacturing a lightweight structural trim part is comprising the following steps: (A) inserting a plurality of layers into a molding tool comprising a first molding half (6) and a second molding half (7). The second molding half (7) comprises a plurality of cup-like indentation (8). The plurality of layers at least comprises a first air permeable skin layer (1) facing the first molding half (6), a second air tight skin layer (3,4) facing the second molding half (7), and a film layer (2) between the two skin layers. (B) Closing the molding tool and discharging gas from one side in order to press the first skin layer against the first molding half. (C) Shaping and consolidating the first porous skin layer. (D) Charging with pressurized air the first space in order to press the second skin layer against the second molding half. (E) Shaping and consolidating the second skin layer. (F) Meanwhile bonding the first and second skin layer to each other in the area between the cup-like indentations, in order to form an acoustic body comprising a plurality of cup-like cavities.

15 Claims, 2 Drawing Sheets

(56) References Cited

FOREIGN PATENT DOCUMENTS

| | | |
|---|---|---|
| DE | 4429627 | 2/1996 |
| EP | 0454949 | 11/1991 |
| EP | 0514616 | 11/1992 |
| EP | 1491327 | 12/2004 |
| WO | 03018291 | 3/2003 |

OTHER PUBLICATIONS

PCT Written Opinion, Nov. 14, 2006.

* cited by examiner

METHOD OF MANUFACTURING OF LIGHTWEIGHT STRUCTURAL TRIM PART AND LIGHTWEIGHT STRUCTURAL TRIM PART PRODUCED

CROSS REFERENCE TO RELATED APPLICATIONS

This application is a National Stage of PCT/EP2006/005861 filed Jun. 19, 2006, claiming priority of Application No. EP 05013120.0 filed Jun. 17, 2005, and is incorporated by reference herein in its entirety.

BACKGROUND OF THE INVENTION

1. Field of the Invention

Present invention is concerned with a method for manufacturing a lightweight structural trim part and with a lightweight structural trim part manufactured in accordance with this method.

2. Description of the Related Art

Lightweight acoustic bodies and methods to manufacture such bodies are well known in the field of automotive technology. A method to manufacture a sound attenuating rear parcel shelf is known from WO03/018291. This method allows to produce a hollow body comprising two thermoformed outer skins, each comprising a porous layer. A sealing film is integrated into each of the two skins. Inner most non-woven insulating sheets are disposed between the sealing films for acoustic reasons and air is blown between the skins while the moulding tool is closed. Unfortunately the air pressed into the moulding tool is flowing through and cooling down the inner most non-woven layers and thereby hampers the consolidation of these layers. The body produced by this method is stiff enough to be able to support its own weight, but doesn't contribute to the stiffness of the vehicle's structure and is not suitable to be used as a vehicle's loadfloor, undershields, truck's walls or other structural trim parts. Structural trim parts contribute to the stability of the vehicle's structure and comprise a recognizable acoustic performance.

BRIEF SUMMARY OF THE INVENTION

It is therefore the object of present invention to achieve a simple method to manufacture a lightweight structural trim part, i.e. an acoustic body with enhanced acoustical performance and stiffness, which is suitable to be used as a vehicle's structural trim part.

This object is achieved by a method for manufacturing a lightweight structural trim part comprising the following steps:

- inserting a plurality of layers into a mounding tool comprising a first moulding half and a second moulding half, which second moulding half comprises a plurality of cup-like indentations. The plurality of layers at least comprises a first air permeable skin layer, preferably a felt layer, facing the first moulding half, a second airtight skin layer, preferably consisting of an outer air permeable cover and an inner airtight film, facing the second moulding half, and an air permeable film layer, in particular a mono- or multilayer porous felt or non-woven, between the two skin layers;
- closing the moulding tool and discharging gas, preferably at about 1 bar, from a first space between the film layer and the first moulding half, or charging with pressurized gas, preferably at 1-8 bar, a second space between the second mould half and the film layer, in order to press the first skin layer against the first moulding half;
- shaping and consolidating the first porous skin layer in a known way by applying suitable temperature and pressure to this layer;
- charging with pressurized gas the said first space via the first moulding half and through the formed first porous skin layer, in order to press the second skin layer against the second moulding half;
- shaping and consolidating the second skin layer in a known way by applying suitable temperature and pressure to this layer;
- meanwhile bonding the first and second skin layer to each other in the area between the cup-like indentations, in order to form the lightweight structural trim part comprising a plurality of cup-like cavities;
- opening the moulding tool and taking the lightweight structural trim part out of the moulding tool.

It is a further object of present invention to achieve a lightweight structural trim part, i.e. a lightweight acoustic body with enhanced acoustical performance and stiffness, which is suitable to be used as a vehicle's structural trim part.

This object is achieved by a lightweight structural trim part comprising at least a first air permeable skin layer, preferably a porous felt layer, a second air tight skin layer, preferably a thermoplastic felt/foil-composite, and an air permeable film layer, preferably a mono- or multilayer porous felt or non-woven, between the two skin layers, which first and second skin layers are consolidated, shaped and bonded to each other in such a way that the lightweight structural trim part comprises a plurality of cup-like cavities.

The advantages of this invention are obvious to the man skilled in the art and in particular have to be seen in the manufacturing of a lightweight structural trim part by a one-step process and additionally in achieving such a structural trim part. In addition this trim part is aesthetically advantageous, since this process is not leading to any visible dark-stained spots from gas injection or any holes from needling. Furthermore the method according to the invention proofs to be very easy to run and therefore is cost saving. The product achieved with this method presents an enhanced acoustic performance, in particular sound absorption, as well as stiffness, which allows this body to be used as under body shield, vehicle's loadfloor, truck's wall or other structural trim part.

BRIEF DESCRIPTION OF THE DRAWINGS

In the following present invention is described in more detail with the aid of a preferred embodiment and with the following figures showing.

DETAILED DESCRIPTION OF THE INVENTION

Figure 1A:
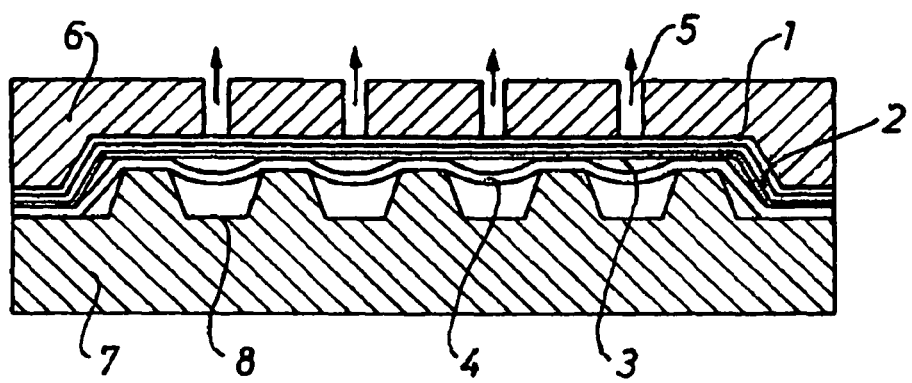
FIG. 1a: Schematic view through a moulding tool during a first process step according to a first method.
Figure 1B:
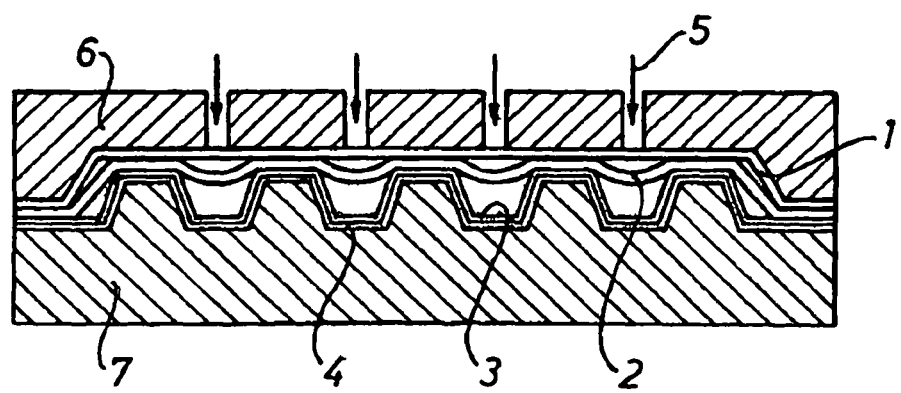
FIG. 1b: Schematic view through a moulding tool during a second process step according to the first method.

FIGS. 1a and 1b are concerned with a first process for manufacturing an acoustic body designed as a double skins part. As an example the mould is loaded with four layers, whereby the outer layers consist of a thermoplastic felt. This felt may consist of a PP non-woven comprising 20% to 60% of reinforcing fibres, in particular glass fibres. The weight of these layers may vary between 800 g/m² to 2000 g/m² depending on the mechanical specifications and targets given. A first film may consist of 100% PP film of 150 microns of thickness. A second film may consist of a porous non-woven of 100% PET and may have a weight of 40 g/m². According to the invention the method for manufacturing a lightweight structural trim part comprises the following steps:

inserting a plurality of layers into a moulding tool comprising a first moulding half 6 and a second moulding half 7, which second moulding half comprises a plurality of cup-like indentations 8, and which plurality of layers at least comprises: a first air permeable skin layer 1, preferably a porous felt layer, facing the first moulding half 6, a second air tight skin layer 3, 4, preferably consisting of an outer air permeable cover layer 3 and an inner air tight film layer 4, facing the second moulding half 7, and an air permeable film layer 2, in particular a mono- or multilayer porous felt or non-woven, between the first 1 and second 3, 4 skin layers;

closing the moulding tool 6, 7 and discharging gas 5 from a first space between the film layer 2 and the first moulding half 6, in order to such the first porous skin layer 1 against the first moulding half 6, shaping and consolidating the first porous skin layer 1, charging with pressurized gas 5 the said first space via the first moulding half 6 and through the formed first porous skin layer 1 and the air permeable film layer 2, in order to press the second skin layer 3, 4 against the second moulding half 7, shaping and consolidating the second skin layer 3, 4, meanwhile bonding the first 1 and second 3, 4 skin layers to each other in the area between the cup-like indentations 8, in order to form a lightweight structural trim part comprising a plurality of cup-like cavities, opening the moulding tool 6, 7 and taking the lightweight structural trim part out of the moulding tool 6, 7.

In a preferred embodiment of this invention the gas 5 is discharged from the first space between the film layer 2 and the first moulding half 6 at about 1 bar.

Figure 2A:
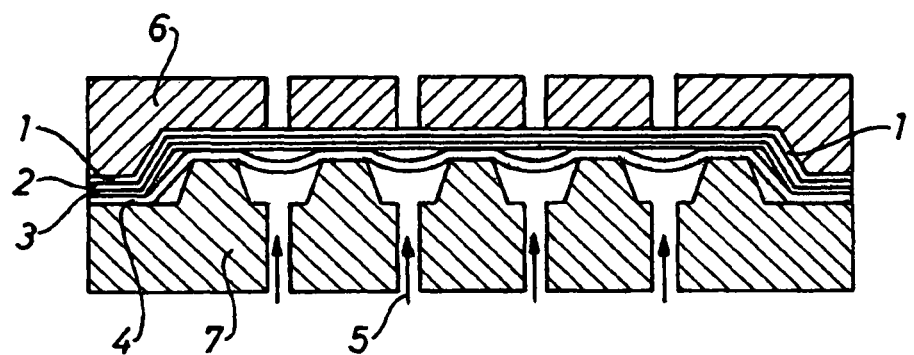
FIG. 2a: Schematic view through a moulding tool during a first process step according to a second method.
Figure 2B:
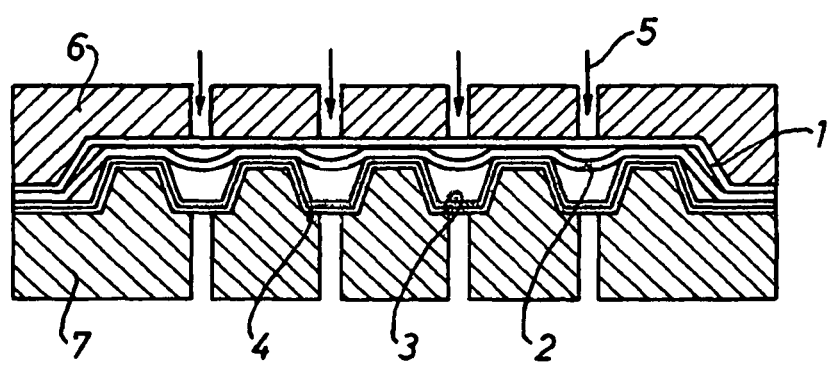
FIG. 2b: Schematic view through a moulding tool during a second process step according to the second method.

According to a second embodiment of the invention as shown in FIGS. 2a, 2b the method for manufacturing an acoustic body comprises the following steps:

inserting a plurality of layers into a moulding tool comprising a first moulding half 6 and a second moulding half 7, which second moulding half comprises a plurality of cup-like indentations 8, and which plurality of layers at least comprises: a first air permeable skin layer 1, preferably a porous felt layer, facing the first moulding half 6, a second air tight skin layer 3, 4, preferably consisting of an outer air permeable cover layer 3 and an inner air tight film layer 4, facing the second moulding half 7, and an air permeable film layer 2, in particular a mono- or multilayer porous felt or non-woven, between the first 1 and second 3, 4 skin layers;

closing the mouding tool 6, 7 and charging a second space between the second mould half 7 and the film layer 2 with pressurized gas 5, in order to press the first porous skin layer 1 against the first moulding half 6, shaping and consolidating the first porous skin layer 1, charging with pressurized gas 5 the said first space via the first moulding half 6 and through the formed first porous skin layer 1 and the air permeable film layer 2, in order to press the second skin layer 3, 4 against the second moulding half 7, shaping and consolidating the second skin layer 3, 4, meanwhile bonding the first 1 and second 3, 4 skin layers to each other in the area between the cup-like indentations 8, in order to form a lightweight structural trim part comprising a plurality of cup-like cavities, opening the moulding tool 6, 7 and taking the lightweight structural trim part out of the moulding tool 6, 7.

In a preferred embodiment of this invention the second space between the second mould half 7 and the film layer 2 is charged with pressurized gas at 1-8 bar.

The lightweight structural trim part manufactured in accordance with these methods comprises at least a first outer air permeable skin layer 1, preferably a thermoplastic PP felt or non-woven with natural fibres, a second impermeable skin layer 3, 4, preferably a thermoplastic felt/foil-composite, and an air permeable film layer 2, preferably a 100% PP film of 150 μm thickness, or a PP/PA/PP composite of 150 μm, between the two skin layers. The first 1 and second 3, 4 skin layers are consolidated, shaped and bonded to each other in such a way that an acoustic body comprising a plurality of cup-like cavities is formed.

Preferred embodiment comprise the features oft the dependent claims.

It is to be understood that the above described trim part may also be used as floor part in buildings. For this usage the porous layer would be at the bottom side and the impervious layer would be on the top side.

Modifications of the above described methods and structural trim part are within the normal technical knowledge of the man skilled in the art. In particular the air permeable film layer 2 may consist of a plurality of porous layers, such as non-wovens made of PET.

The invention claimed is:

1. Method for manufacturing a lightweight structural trim part, comprising:
    inserting a plurality of layers into a moulding tool comprising a first moulding half and a second moulding half, wherein the second moulding half includes a plurality of cup-like indentations, and wherein the plurality of layers includes:
        a first air permeable skin layer facing the first moulding half,
        a second skin layer that is substantially air tight and facing the second moulding half, and
        an air permeable film layer between the first and second skin layers;
    closing the moulding tool such that a first space is formed between the air permeable film layer and the first moulding half, and causing the first air permeable skin layer to be pressed against the first moulding half;
    shaping and consolidating the first air permeable skin layer;
    charging with pressurized gas the said first space via the first moulding half through the formed first air permeable skin layer and the air permeable film layer, in order to press the second skin layer against the second moulding half;
    shaping and consolidating the second skin layer;
    bonding the first and second skin layers to each other in an area between the cup-like indentations, in order to form a lightweight structural trim part comprising a plurality of cup-like cavities; and
    opening the moulding tool and removing the lightweight structural trim part from the moulding tool.

2. Method for manufacturing a lightweight structural trim part according to claim 1, wherein the gas is discharged from the first space between the air permeable film layer and the first moulding half at about 1 bar.

3. Method for manufacturing a lightweight structural trim part according to claim 1, wherein a second space between the second mould half and the air permeable film layer is charged with pressurized gas at 1-8 bar.

4. Method for manufacturing a lightweight structural trim part according to claim 1, wherein the first air permeable skin layer is a porous felt layer.

5. Method for manufacturing a lightweight structural trim part according to claim 1, wherein the second air tight skin layer includes an outer air permeable cover layer and an inner air tight film layer.

6. Method for manufacturing a lightweight structural trim part according to claim 1, further comprising discharging gas from the first space.

7. Method for manufacturing a lightweight structural trim part according to claim 1, further comprising charging a second space between the second mould half and the air permeable film layer with pressurized gas.

8. Method for manufacturing a lightweight structural trim part according to claim 1, wherein the air permeable film layer is a mono- or multilayer porous felt layer or non-woven layer.

9. Lightweight structural trim part manufactured by the method according to claim 1, wherein the first air permeable skin layer comprises a thermoplastic felt layer or a non-woven layer.

10. Lightweight structural trim part according to claim 9, wherein the second air tight skin layer comprises an air permeable thermoplastic felt layer and an air tight film layer.

11. Lightweight structural trim part according to claim 10, wherein the air tight film layer is a 100% polypropylene film of 150 μm thickness.

12. Lightweight structural trim part according to claim 10, wherein the air tight film layer is a polypropylene/polyamides/polypropylene composite of 150 μm thickness.

13. Lightweight structural trim part according to claim 1, wherein the air permeable film layer is 100% polyethylene terephthalate material of 40 g/m$^2$.

14. Lightweight structural trim part according to claim 9, wherein the first air permeable skin layer includes polypropylene fibres and 20% to 60% of either glass or natural fibres.

15. Lightweight structural trim part according to claim 10, wherein the air permeable thermoplastic felt layer includes polypropylene fibres and 20% to 60% of either glass or natural fibres.

* * * * *